(12) United States Patent
Kim

(10) Patent No.: US 6,373,548 B1
(45) Date of Patent: Apr. 16, 2002

(54) ALIGNMENT KEY FORMED ON THE SUBSTRATE OF THE LIQUID CRYSTAL DISPLAY DEVICE

(75) Inventor: Jong Sung Kim, Kyonggi-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/533,969

(22) Filed: Mar. 23, 2000

(30) Foreign Application Priority Data

Jul. 31, 1999 (KR) .......................................... 99-31488

(51) Int. Cl.$^7$ ............................................ G02F 1/1333
(52) U.S. Cl. ...................... 349/158; 349/110; 349/129; 257/797; 437/8
(58) Field of Search ................................ 349/158, 110, 349/129; 257/797; 437/5

(56) References Cited

U.S. PATENT DOCUMENTS 5,672,520 A * 9/1997 Natsume ........................ 437/8
5,760,484 A * 6/1998 Lee et al. .................... 257/797
6,043,858 A * 5/2000 Koike et al. ................. 349/110
6,198,519 B1 * 3/2001 Chang ......................... 349/129
6,204,895 B1 * 3/2001 Nakamura et al. ............. 349/5

* cited by examiner

Primary Examiner—Kenneth Parker
Assistant Examiner—David Chung
(74) Attorney, Agent, or Firm—Birch, Stewart, Kolasch & Birch LLP

(57) ABSTRACT

Disclosed is a liquid crystal display device, comprising: a first substrate including a first alignment key formed thereon, the first alignment key having at least first and second alignment marks spaced from each other; and a second substrate to be aligned with the first substrate, including a second alignment key formed thereon, the second alignment key having at least third and fourth alignment marks, the third alignment mark being formed at a corresponding position of the first alignment mark of the first alignment key, the fourth alignment mark being offset at least a first predetermined distance in at least a first direction from the second alignment mark of the first alignment key. Using an alignment key of the present invention, since the upper and lower substrates can be correctly aligned each other, there is an advantage that a low yield resulting from an alignment error is prevented, and it is easy to identify a misalignment, quantify its magnitude in two directions, and thus be able to discern whether two substrates are correctly aligned with each other or not.

18 Claims, 5 Drawing Sheets

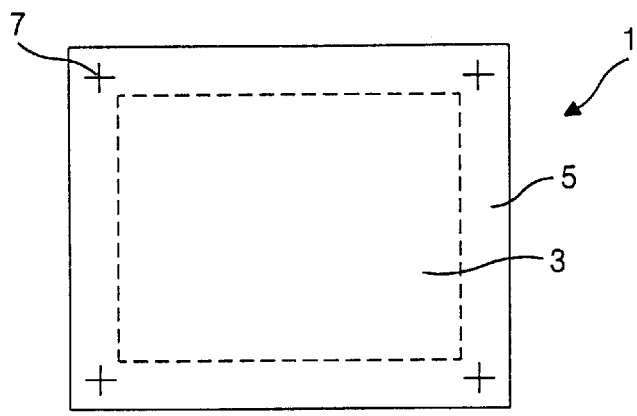
(RELATED ART)
FIG. 1
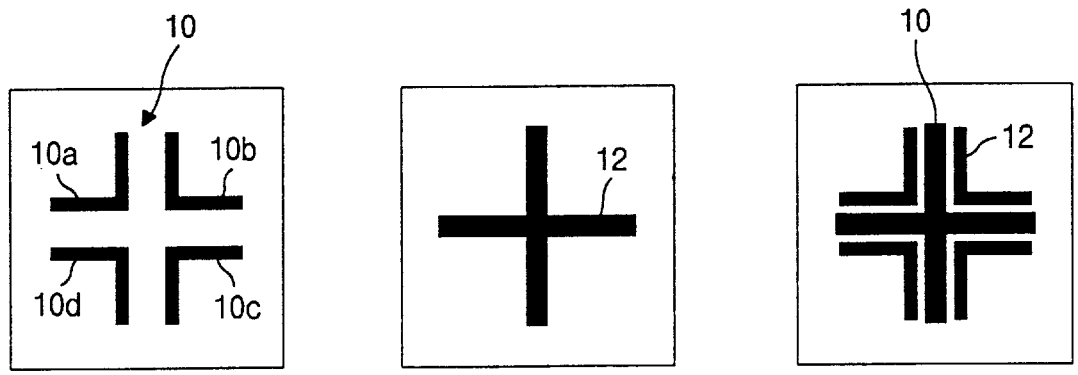
(RELATED ART)
FIG. 2a
(RELATED ART)
FIG. 2b
(RELATED ART)
FIG. 2c

ALIGNMENT KEY FORMED ON THE SUBSTRATE OF THE LIQUID CRYSTAL DISPLAY DEVICE

CROSS REFERENCE

This application claims the benefit of Korean Patent Application No. 1999-31488, filed on Jul. 31, 1999, under 35 U.S.C. § 119, the entirety of which is hereby incorporated by reference.

BACKGROUND OF THE INVENTION

1. Field of the invention

The present invention relates to an alignment key, more particularly to an alignment method and alignment key used for an alignment between two substrates of a liquid crystal display device (LCD).

2. Description of Related Art

A liquid crystal display device (LCD) is comprised of two substrates opposite to and spaced from each other by a predetermined distance, liquid crystal between the two substrates, and a plurality of layers formed between the liquid crystal and the two substrates.

Alignment keys are formed on both of the substrates as a means of alignment of two substrates. An alignment state is checked by whether the alignment keys are correctly aligned with each other or not.

Recently, since the LCD tends to be much more integrated than before for a full-color implementation close to a natural color, distances between the components have been narrowed more and more.

Therefore, since only a little misalignment may cause a bad color characteristic and a low yield, the importance of good alignment has been rising.

Now, an alignment key of the LCD will be described with reference to accompanying drawings FIG. 1 is a plan view illustrating the alignment key of a LCD formed on a substrate. The substrate 1 has an active region 3 on which the substantial components are arranged and a non-active region 5 that will be removed and disused soon after the alignment process is completed. The non-active region 5 has cross-shaped alignment keys on each edge thereof.

The alignment keys 7 formed on the upper and lower substrates, respectively, become a means of alignment between the upper and lower substrates.

FIG. 2a is a plan view illustrating a conventional alignment key formed on the upper substrate of the LCD. The cross-shaped alignment key 10 includes four align marks 10a, 10b, 10c and 10d, which are spaced from each other by a predetermined distance.

FIG. 2b also shows the cross-shaped alignment key formed on the lower substrate. Though the upper and lower alignment keys 10 and 12 are made in the beginning process, they are used in the alignment process.

When the upper substrate is aligned with the lower substrate, as shown in FIG. 2c, the upper and lower alignment keys 10 and 12 look as if they are formed on the same substrate. When the alignment key 10 of the upper substrate is located within the alignment key 12 of the lower substrate, it is assumed that the upper substrate is correctly aligned with the lower substrate. In general, two alignment keys are formed on two edges of the substrates in a diagonal line direction. In some cases, four alignment keys may be formed on each edge of the substrates.

The alignment key used in the related art LCD, however, is a means for checking a misalignment state between the upper and lower substrates rather than for measuring an alignment error between two substrates.

Though an alignment error between the upper and lower substrates may be checked more or less, it is impossible to measure an alignment error.

Therefore, it is required to find a misalignment direction whether they are misarranged in a row direction or in a column direction.

SUMMARY OF THE INVENTION

An object of the present invention is to provide an alignment method and an alignment key of the LCD capable of finding misalignment direction.

Another object of the present invention is to provide an alignment method and an alignment key of the LCD capable of monitoring the process errors immediately.

The invention provides, in one embodiment, a liquid crystal display device, comprising: a first substrate including a first alignment key formed thereon, the first alignment key having at least first and second alignment marks spaced from each other; and a second substrate to be aligned with the first substrate, including a second alignment key formed thereon, the second alignment key having at least third and fourth alignment marks, the third alignment mark being formed at a corresponding position of the first alignment mark of the first alignment key, the fourth alignment mark being formed at a distant position from the second alignment mark of the first alignment key, the distant position being measured in advance.

The alignment marks of the first alignment key are disposed in a matrix form. The alignment marks of the second alignment key are disposed in a matrix form. The number of the alignment marks of the first alignment key is substantially same as that of the second alignment key. A distance from the second alignment mark of the first alignment key to the fourth alignment mark of the second alignment key is indicated by a coordinate. The coordinate is an X-Y coordinate.

Each alignment mark of the first alignment key has a rectangular shape. Each alignment mark of the second alignment key has a rectangular shape of a rectangular. Each alignment mark of the first alignment key has a circular shape.

Each alignment mark of the second alignment key has a shape of a circle.

Each distance between a fifth alignment mark of the first alignment key and a corresponding alignment mark of the second alignment key increases as the fifth alignment mark of the first alignment key becomes more distant from a center of the second alignment key.

The invention provides, in another embodiment, a liquid crystal display device comprising: a first substrate including a first alignment key formed thereon, said first alignment key being a matrix of uniformly distributed alignment marks; and a second substrate including a second alignment key formed thereon, said second alignment key being a matrix of non-uniformly distributed alignment marks. The first alignment key and said second alignment key together define a plurality of pairs of corresponding alignment marks. Alignment of said first alignment key and said second alignment key causes a first subset (e.g., one pair) of said plurality of alignment mark pairs to align correctly while also causing a second subset (e.g., another pair) of said plurality of alignment mark pairs to align incorrectly. Misalignment of said first alignment key and said second alignment key causes said first subset of said plurality of alignment mark pairs to align incorrectly while also causing a third subset (e.g., one pair) of said second subset to align correctly. Locations of said third subset relative to said first subset are indicative of a degree to which said second alignment key is misaligned with said first alignment key.

The foregoing and other objectives of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

For a more complete understanding of the present invention and advantages thereof, reference is now made to the following descriptions taken in conjunction with the accompanying drawings, in which like reference numerals like parts, and in which:

FIG. 1 is a plan view illustrating an alignment key of a liquid crystal display device (LCD) formed on a substrate according to the related art;

FIGS. 2a and 2b are plan views illustrating alignment keys of a liquid crystal display (LCD) formed on upper and lower substrates, respectively, according to the related art;

FIG. 2c is a plan view illustrating the aligned state of the alignment keys of the upper and lower substrates according to the related art;

DETAILED DESCRIPTION OF PREFERRED EMBODIMENTS

A preferred embodiment of the present invention will now be described in detail with reference to the accompanying drawings.

Figure 3A:
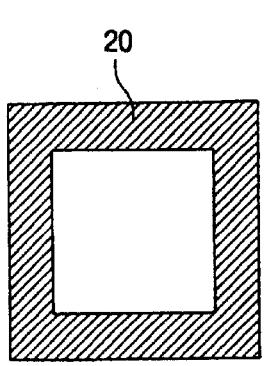
FIGS. 3a to 3c are similar views to FIGS. 2a to 2c, respectively, in accordance with an embodiment of the invention.
Figure 3B:
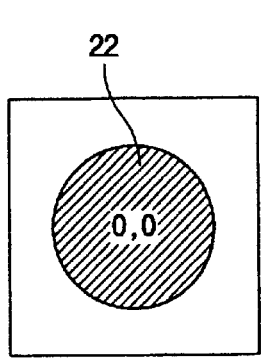

FIG. 3a shows a rectangular alignment mark 20 formed on an upper substrate (not shown) of a liquid crystal display device (LCD) and FIG. 3b shows a circular alignment mark 22 formed on a lower substrate (not shown) of the LCD.

Figure 3C:
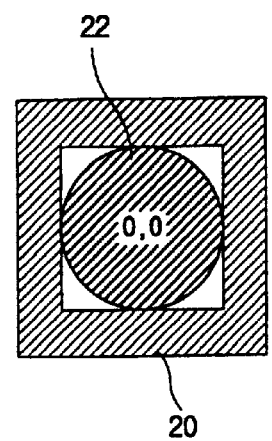

As shown in FIG. 3c, when the upper substrate is aligned with the lower substrate, the alignment marks 20 and 22 look as if formed on the same substrate.

Figure 4:
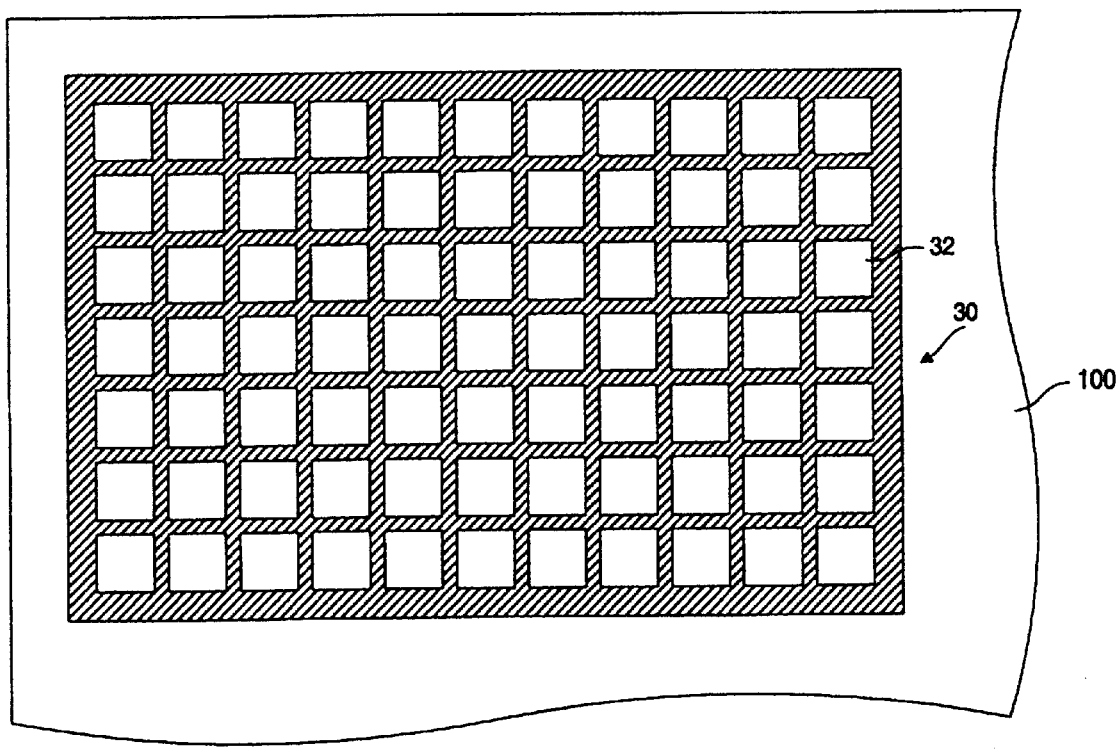
FIG. 4 is a plan view illustrating rectangular alignment marks in accordance with the embodiment of the invention.

FIG. 4 shows a first alignment key 30 having a plurality of rectangular alignment marks 32, disposed in the form of a matrix, formed on the upper substrate 100. Distances between two adjacent rectangular alignment marks 32 are preferably equal.

Figure 5:
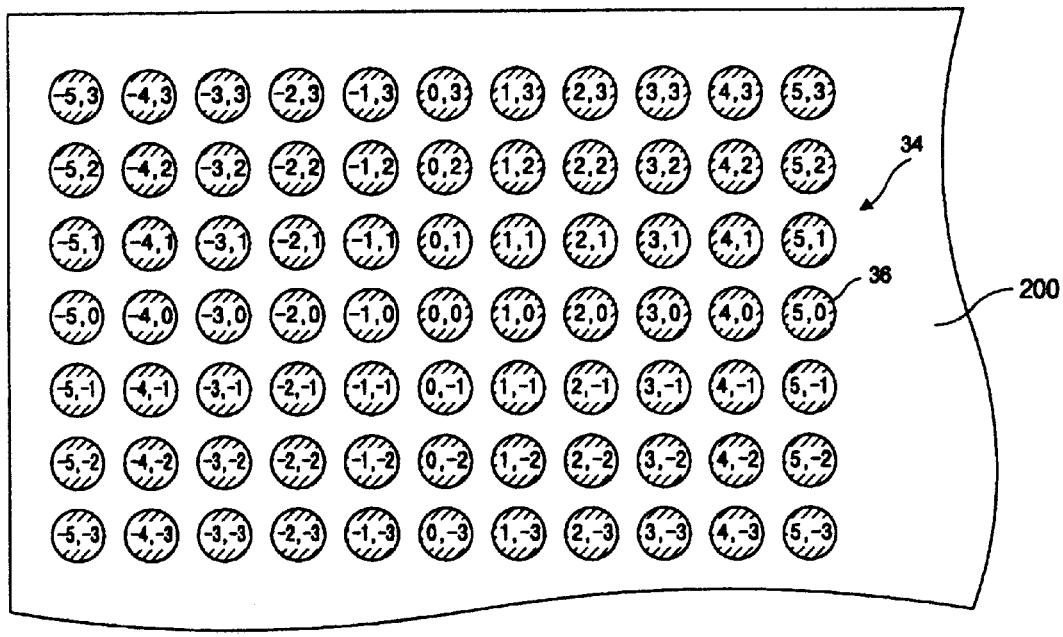
FIG. 5 is a plan view illustrating circular alignment marks in accordance with the embodiment of the invention.

FIG. 5 shows a second alignment key 34 having a plurality of circular alignment marks 36, disposed in the form of a matrix, formed on the lower substrate 200. Distances between two adjacent circular alignment marks 36 are equal, but are different from that between two adjacent rectangular alignment marks 32. The number of the circular alignment marks 36 is preferably same as that of the rectangular alignment marks 32.

Each of the alignment marks 36 of the second alignment key 34 has a coordinate (a, b). Coordinates (a, b) of an circular alignment mark 36 means that the circular alignment mark is spaced from corresponding rectangular alignment mark 32 of the first alignment key 30 by "a" in an X axis direction and "b" in a Y axis direction, if upper and lower substrates are aligned with each other correctly.

That is, a circular alignment mark of a coordinate (0,0) exactly corresponds to a corresponding rectangular alignment mark, preferably, in the center of the alignment marks 32 of the first alignment key 30. Alternatively, another non-centered pair of corresponding alignment marks could be chosen as the pair to denote correct alignment. Also, more than one pair of alignment marks could be chosen to collectively denote correct alignment. But this would be less preferred in the sense that it would reduce the number of pairs of corresponding alignment marks that are available to denote misalignment, and therefore would reduce the number of such pairs available to denote a relative amount of misalignment, as will be discussed more below.

When it is assumed that the unit distance for the coordinates is 1 unit, e.g., µm, the circular alignment mark 36 of a coordinate (−3,2) is formed spaced from the corresponding rectangular alignment mark 32 of the first alignment key 30 by −3 units in an X axis direction and 2 units in a Y axis direction.

Figure 6:
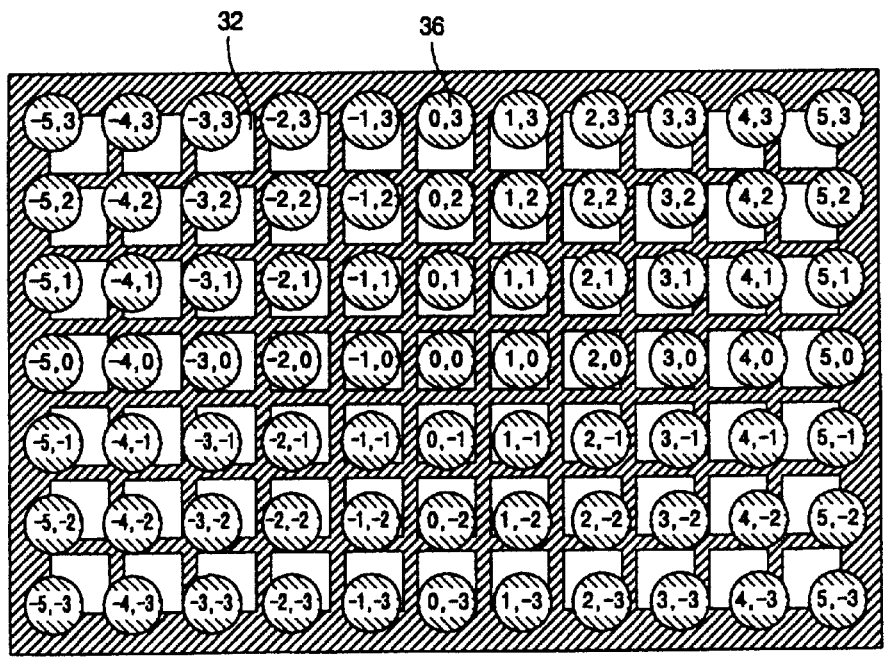
FIG. 6 is a plan view illustrating the first and second alignment keys when an upper substrate is aligned exactly with a lower substrate in accordance with the embodiment of the invention.

FIG. 6 shows exact alignment between two substrates, since the circular alignment mark with coordinate (0,0) is fully shown within a corresponding rectangular alignment mark.

Figure 7:
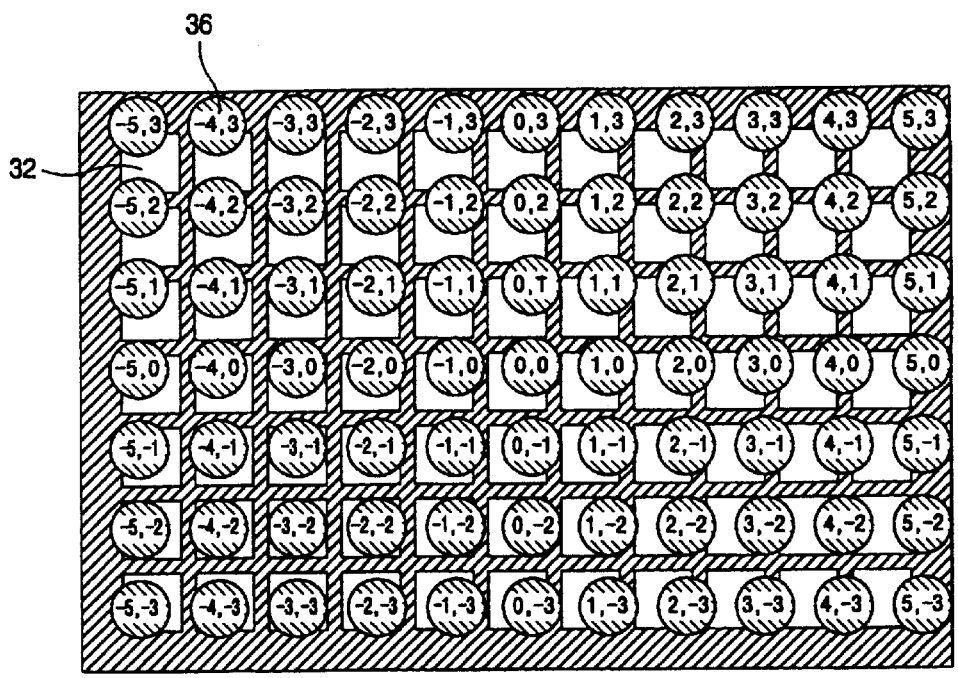
FIG. 7 is a plan view illustrating the first and second alignment keys when an upper substrate is misaligned with a lower substrate in accordance with the embodiment of the invention.

FIG. 7 shows an example of misalignment between two substrates having the alignment keys according to the embodiment of the invention. In the figure, the circular alignment mark with coordinate (−3, −2) is fully shown within the corresponding rectangular alignment mark of the first alignment key 30, thus the upper substrate is shifted by −3 units in the X-direction and −2 units in the Y direction from the exact alignment position.

According to the invention, it is easy to find a misalignment and quantify its magnitude in two directions, and thus to be able to discern whether two substrates are correctly aligned with each other or not.

Therefore, since the upper and lower substrates can be correctly aligned with each other, there is an advantage to prevent a low yield resulting from alignment error.

Figure 8:
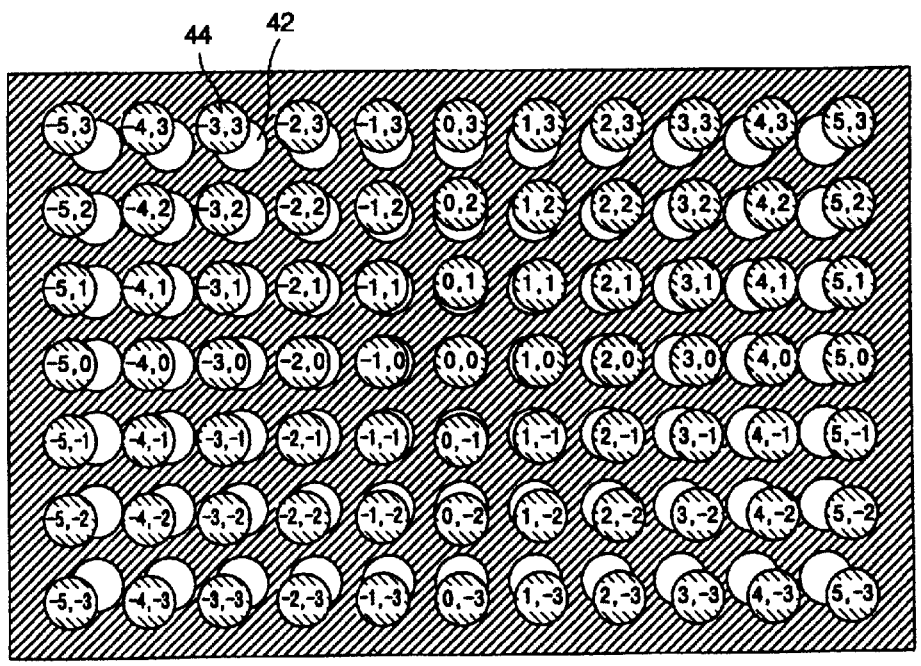
FIG. 8 is a plan view illustrating another modified example of first and second alignment keys when an upper substrate is aligned with a lower substrate in the LCD according to the embodiment of the invention.

FIG. 8 shows modified shapes of the alignment keys of the present invention, where all of first and second alignment marks 42 and 44 are in the form of a circle.

The dispositions of the first and second alignment marks 42 and 44 are substantially same as those shown in FIG. 6.

Figure 9:
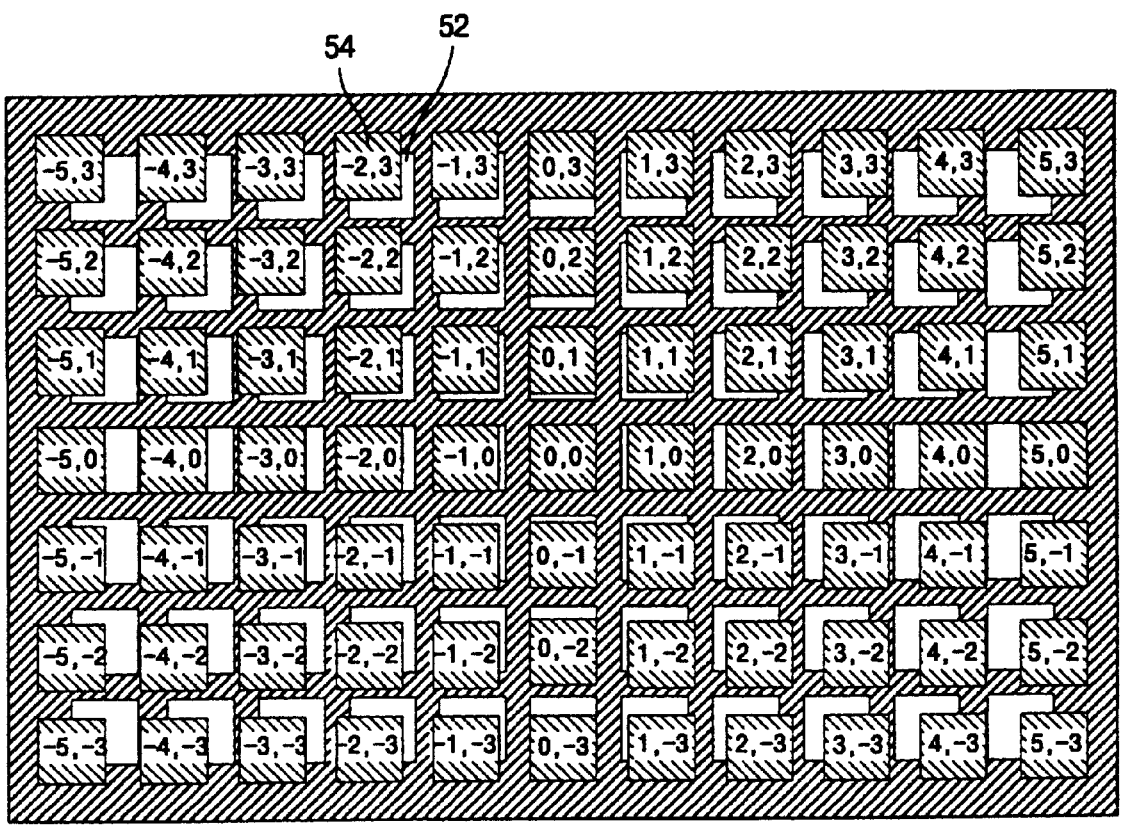
FIG. 9 is a plan view illustrating another modified example of first and second alignment keys when an upper substrate is aligned with a lower substrate in the LCD in accordance with the embodiment of the invention.

FIG. 9 shows another modified shapes of the alignment keys of the present invention, all of first and second alignment marks 52 and 54 are in the form of a rectangle.

The dispositions of the first and second alignment marks 52 and 54 are substantially same as those shown in FIG. 6.

Other embodiments of the invention will be apparent to the skilled in the art from consideration of the specification and practice of the invention disclosed herein. It is intended that the specification and examples be considered as exemplary only, with the true scope and spirit of the invention being indicated by the following claims.

What is claimed is:

1. A liquid crystal cell, comprising:
   a first substrate including a first alignment key formed thereon, the first alignment key having at least first and second alignment marks spaced from each other; and
   a second substrate to be aligned with the first substrate, including a second alignment key formed thereon, the second alignment key having at least third and fourth alignment marks, the third alignment mark being formed at a corresponding position of the first alignment mark of the first alignment key, the fourth alignment mark being offset a first predetermined distance in at least a first direction from the second alignment mark of the first alignment key.

2. A liquid crystal cell of claim 1, wherein the alignment marks of the first alignment key are disposed in a matrix form.

3. A liquid crystal cell of claim 1, wherein the alignment marks of the second alignment key are disposed in a matrix form.

4. A liquid crystal cell of claim 1, wherein number of the alignment marks of the first alignment key is substantially same as that of the second alignment key.

5. A liquid crystal cell of claim 1, wherein a distance from the second alignment mark of the first alignment key to the fourth alignment mark of the second alignment key is indicated by a coordinate.

6. A liquid crystal cell of claim 5, wherein the coordinate is an X-Y coordinate.

7. A liquid crystal cell of claim 1, wherein each alignment mark of the first alignment key has a rectangular shape.

8. A liquid crystal cell of claim 1, wherein each alignment mark of the second alignment key has a rectangular shape.

9. A liquid crystal cell of claim 1, wherein each alignment mark of the first alignment key has a circular shape.

10. A liquid crystal cell of claim 1, wherein each alignment mark of the second alignment key has a shape of a circle.

11. A liquid crystal cell of claim 1, wherein each distance between a fifth alignment mark of the first alignment key and a corresponding alignment mark of the second alignment key increases as the fifth alignment mark of the first alignment key becomes more distant from a center of the second alignment key.

12. A liquid crystal cell of claim 1, wherein the fifth alignment mark is offset a second predetermined distance in a second direction, perpendicular to said first direction, from said second mark.

13. A liquid crystal cell comprising:
    a first substrate including a first alignment key formed thereon, said first alignment key being a matrix of uniformly distributed alignment marks; and
    a second substrate including a second alignment key formed thereon, said second alignment key being a matrix of non-uniformly distributed alignment marks.

14. A liquid crystal cell of claim 13, wherein:
    said first alignment key and said second alignment key together define a plurality of pairs of corresponding alignment marks;
    alignment of said first alignment key and said second alignment key causes a first subset of said plurality of alignment mark pairs to align correctly while also causing a second subset of said plurality of alignment mark pairs to align incorrectly.

15. A liquid crystal cell of claim 13, wherein said first subset has one pair of corresponding alignment marks.

16. A liquid crystal cell of claim 13, wherein:
    misalignment of said first alignment key and said second alignment key causes said first subset of said plurality of alignment mark pairs to align incorrectly while also causing a third subset of said second subset to align correctly.

17. A liquid crystal cell of claim 16, wherein said third subset has one pair of corresponding alignment marks.

18. A liquid crystal cell of claim 16, wherein locations of said third subset relative to said first subset is indicative of a degree to which said second alignment key is misaligned with said first alignment key.

* * * * *